US011673332B2

(12) United States Patent
Hartman et al.

(10) Patent No.: US 11,673,332 B2
(45) Date of Patent: Jun. 13, 2023

(54) PATTERNS OF VARIABLE REFLECTANCE IN ADDITIVE MANUFACTURING

(71) Applicant: Hewlett-Packard Development Company, L.P., Spring, TX (US)

(72) Inventors: Aja Hartman, Palo Alto, CA (US); Lihua Zhao, Palo Alto, CA (US); David Woodlock, Vancouver, WA (US); Lee Dockstader, Vancouver, WA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/256,676

(22) PCT Filed: Mar. 15, 2019

(86) PCT No.: PCT/US2019/022473
§ 371 (c)(1),
(2) Date: Dec. 29, 2020

(87) PCT Pub. No.: WO2020/190258
PCT Pub. Date: Sep. 24, 2020

(65) Prior Publication Data
US 2021/0402702 A1 Dec. 30, 2021

(51) Int. Cl.
*G05B 19/4099* (2006.01)
*B29C 64/386* (2017.01)
(Continued)

(52) U.S. Cl.
CPC ............ *B29C 64/386* (2017.08); *B22F 10/80* (2021.01); *B33Y 50/00* (2014.12);
(Continued)

(58) Field of Classification Search
CPC ... B29C 64/386; B29C 64/165; B29C 64/393; B29C 64/153; B33Y 50/00; B22F 10/80;
(Continued)

(56) References Cited

U.S. PATENT DOCUMENTS 9,740,974 B2  8/2017  Kumar et al.
9,864,940 B2  1/2018  Flores et al.
(Continued)

FOREIGN PATENT DOCUMENTS

EP         1437882         3/2011
WO   WO-2017019102 A1    2/2017
WO   WO-2017188963 A1   11/2017

OTHER PUBLICATIONS

Byrne, A. and Hilbert, D.R., 1997, Colors and Reflectances, http://web.mit.edu/abyrne/www/colors&reflectances.html (Year: 1997).*
(Continued)

*Primary Examiner* — Alicia M. Choi
(74) *Attorney, Agent, or Firm* — Shook, Hardy & Bacon L.L.P.

(57) ABSTRACT

In an example, a method includes operating, by a processor, on object model data. The object model data describes at least part of an object to be generated in additive manufacturing. The method also includes determining, by a processor, pattern data. The pattern data comprising areas of variable reflectance intended to be formed on a portion of the object. The method includes determining, by a processor, object generation instructions to apply a fusing agent to at least part of a layer of build material corresponding to the portion of the object in a density corresponding to the reflectance of the generated pattern data.

16 Claims, 5 Drawing Sheets

(51) Int. Cl.
  B33Y 50/00 (2015.01)
  B22F 10/80 (2021.01)
  *G06F 30/10* (2020.01)
  *G06F 113/10* (2020.01)

(52) U.S. Cl.
  CPC .............. *G05B 19/4099* (2013.01); *G05B 2219/35012* (2013.01); *G05B 2219/45028* (2013.01); *G06F 30/10* (2020.01); *G06F 2113/10* (2020.01)

(58) Field of Classification Search
  CPC ...... G05B 19/4099; G05B 2219/35012; G05B 2219/45028; G06F 30/10; G06F 2113/10
  See application file for complete search history.

(56) References Cited

U.S. PATENT DOCUMENTS

| | | | | |
|---|---|---|---|---|
| 11,167,477 | B1* | 11/2021 | Hays | B29C 64/343 |
| 2005/0001356 | A1* | 1/2005 | Tochimoto | B29C 64/165 |
| | | | | 425/130 |
| 2005/0072113 | A1 | 4/2005 | Collins et al. | |
| 2007/0164113 | A1* | 7/2007 | Culp | G06K 19/06028 |
| | | | | 235/462.01 |
| 2007/0238056 | A1* | 10/2007 | Baumann | B33Y 10/00 |
| | | | | 430/325 |
| 2008/0122141 | A1* | 5/2008 | Bedal | C08J 5/00 |
| | | | | 428/32.72 |
| 2015/0145158 | A1* | 5/2015 | Levine | B29C 64/112 |
| | | | | 264/308 |
| 2016/0067927 | A1 | 3/2016 | Voris et al. | |
| 2016/0255237 | A1* | 9/2016 | Misfeldt | B33Y 80/00 |
| | | | | 428/201 |
| 2017/0014911 | A1* | 1/2017 | Ng | B22F 10/28 |
| 2017/0151716 | A1* | 6/2017 | Lu | B29C 48/15 |
| 2017/0165919 | A1* | 6/2017 | Ohi | B29C 64/386 |
| 2017/0311164 | A1 | 10/2017 | Shin et al. | |
| 2018/0029300 | A1* | 2/2018 | Batchelder | B29C 64/153 |
| 2020/0316849 | A1* | 10/2020 | Ohi | B33Y 50/00 |
| 2021/0170690 | A1* | 6/2021 | Gupta | G06K 19/06037 |

OTHER PUBLICATIONS

Babaei, Vahid et al. "Color Contoning for 3D Printing." ACM Transactions on Graphics (TOG) 36, No. 4, Article 124 (Jul. 2017), 15 pages, https://doi.org/10.1145/3072959.3073605.

* cited by examiner

PATTERNS OF VARIABLE REFLECTANCE IN ADDITIVE MANUFACTURING

BACKGROUND

Additive manufacturing techniques may generate a three-dimensional object through the solidification of a build material, for example on a layer-by-layer basis. In examples of such techniques, build material may be supplied in a layer-wise manner and the solidification method may include heating the layers of build material to cause melting in selected sub-regions. In other techniques, chemical solidification methods may be used.

BRIEF DESCRIPTION OF DRAWINGS

Non-limiting examples will now be described with reference to the accompanying drawings, in which.

DETAILED DESCRIPTION

Additive manufacturing techniques may generate a three-dimensional object through the solidification of a build material. In some examples, the build material is a powder-like granular material, which may for example be a plastic, ceramic or metal powder and the properties of generated objects may depend on the type of build material and the type of solidification mechanism used. Build material may be deposited, for example on a print bed and processed layer by layer, for example within a fabrication chamber. According to one example, a suitable build material may be PA12 build material commercially known as V1R10A "HP PA12" available from HP Inc.

In some examples, selective solidification is achieved through directional application of energy, for example using a laser or electron beam which results in solidification of build material where the directional energy is applied. In other examples, at least one print agent may be selectively applied to the build material, and may be liquid when applied. For example, a fusing agent (also termed a 'coalescence agent' or 'coalescing agent') may be selectively distributed onto portions of a layer of build material in a pattern derived from data representing a slice of a three-dimensional object to be generated (which may for example be generated from structural design data). The fusing agent may have a composition which absorbs energy such that, when energy (for example, heat) is applied to the layer, the build material coalesces and solidifies to form a slice of the three-dimensional object in accordance with the pattern. In other examples, coalescence may be achieved in some other manner.

In an example, a suitable fusing agent may be an ink-type formulation comprising carbon black, such as, for example, the fusing agent formulation commercially known as V1Q60Q "HP fusing agent" available from HP Inc. In some examples, a fusing agent may comprise at least one of an infra-red light absorber, a near infra-red light absorber, a visible light absorber and a UV light absorber. Examples of print agents comprising visible light enhancers are dye based colored ink and pigment based colored ink, such as inks commercially known as CE039A and CE042A available from HP Inc.

In addition to a fusing agent, in some examples, a print agent may comprise a coalescence modifier agent, which acts to modify the effects of a fusing agent for example by reducing or increasing coalescence or to assist in producing a particular finish or appearance to an object, and such agents may therefore be termed detailing agents. In some examples, detailing agent may be used near edge surfaces of an object being printed. According to one example, a suitable detailing agent may be a formulation commercially known as V1Q61A "HP detailing agent" available from HP Inc. A coloring agent, for example comprising a dye or colorant, may in some examples be used as a fusing agent or a coalescence modifier agent, and/or as a print agent to provide a particular color for the object.

As noted above, additive manufacturing systems may generate objects based on structural design data. This may involve a designer generating a three-dimensional model of an object to be generated, for example using a computer aided design (CAD) application. The model may define the solid portions of the object, and in some examples properties such as color, strength, density and the like. To generate a three-dimensional object from the model using an additive manufacturing system, the model data may in some examples be processed to generate slices of parallel planes of the model. Each slice may define a portion of a respective layer of build material that is to be solidified or caused to coalesce by the additive manufacturing system.

Figure 1:
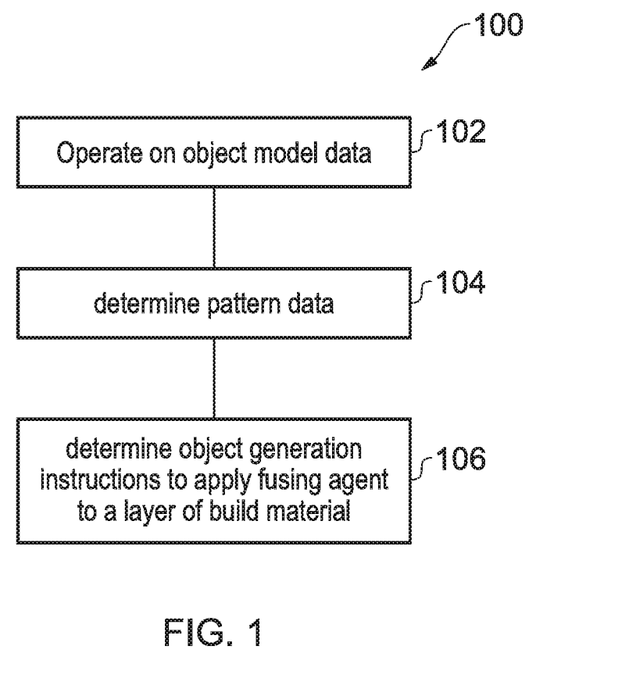
FIG. 1 is a flowchart of an example method generating an object.

FIG. 1 is an example of a method 100, which may comprise a computer implemented method, and/or which may comprise a method of determining object generation instructions for generating at least one object layer by additive manufacturing, and/or may comprise a method of additive manufacturing or for generating an object (e.g. a three-dimensional object) by additive manufacturing. The method comprises, in block 102, operating on, by a processor, on object model data, the object model data describing at least part of an object to be generated in additive manufacturing.

The object model data may comprise data representing at least a portion of an object to be generated by an additive manufacturing apparatus by fusing a build material. The object model data may for example comprise a Computer Aided Design (CAD) model, and/or may for example comprise a STereoLithographic (STL) data file, and/or may be derived therefrom. In some examples, the data may be received over a network, or received from a local memory or the like. In some examples, the data may define the shape of the part of an object, i.e. its geometry. In some examples, the data may define an appearance property, for example at least one intended colour, pattern, translucency, gloss or the like. In some examples the data may define at least one mechanical property, for example strength, density, resilience or the like. In some examples, the data may define at least one functional property, for example, conductivity in at least one object portion. Such properties may be associated with regions of the object, for example a color may be defined at an object surface.

In some examples, the object may be defined in terms of sub-volumes, each of which represents a region of the object which is individually addressable in object generation. In some examples herein, the sub-volumes may be referred to as voxels, i.e. three-dimensional pixels, wherein each voxel occupies or represents a discrete volume. In some examples of additive manufacturing, three-dimensional space may be characterised in terms of such voxels. In some examples, the voxels are determined bearing in mind the print resolution of an object generation apparatus, such that each voxel represents a region which may be uniquely addressed when applying print agents, and therefore the properties of one voxel may vary from those of neighbouring voxel(s). In other words, a voxel may correspond to a volume which can be individually addressed by an object generation apparatus (which may be a particular object generation apparatus, or a class of object generation apparatus, or the like) such that the properties thereof can be determined at least substantially independently of the properties of other voxels. For example, the 'height' of a voxel may correspond to the height of a layer of build material. In some examples, the resolution of an object generation apparatus may exceed the resolution of a voxel. In general, the voxels of an object model may each have the same shape (for example, cuboid or tetrahedral), but they may in principle differ in shape. In some examples, voxels are cuboids having the height of a layer of build material. In some examples, in processing object model data representing an object, each voxel may be associated with properties, and/or object generation instructions, which apply to the voxel as a whole.

In other examples, the object may be described in some other way, for example using a vector or polygon mesh based model. In some such examples, a voxel model may be derived from another model type.

In some examples, the method of FIG. 1 may be carried out on a slice by slice basis. In some examples, each slice may correspond to a layer to be generated in a layer-by-layer additive manufacturing process. In some examples, such slices may be slices of a virtual build volume modelling an intended 'real' build volume, and may comprise slices taken from more than one object model. In some examples, the slices may be one voxel thick.

The method 100 comprises, at block 104, determining, by a processor, pattern data. The pattern data comprises areas of variable reflectance intended to be formed on a portion of the object to be generated in additive manufacturing. For example, the pattern data may describe an identification code. In these examples, the pattern data describes an identification code comprising areas of variable reflectance intended to be formed on a portion of the object to be generated. For example, the pattern describes an identification code, the identification code intended to be formed on a portion of the object to be generated in additive manufacturing. The portion of the object to be generated in additive manufacturing on which the identification code is intended to be formed may comprise a part of a slice of the object on an interior of the object (e.g. on an internal region thereof, for example not on an external surface or boundary of the object) or may comprise part of a slice of the object on an exterior surface of the object, or boundary of the object. In some examples, the portion of the object to be generated in additive manufacturing on which the identification code is intended to be formed may comprise both part of an interior region of the object and an exterior (or boundary) surface of the object. Accordingly, the pattern data may describe a pattern to be formed on an internal, or an external, portion of the object to be generated.

The identification code may comprise machine-readable optical label. For example the identification code may comprise a barcode, for example a one-dimensional, or linear, barcode, or a matrix barcode, e.g. a two-dimensional barcode, such as a quick response (QR) code. In such examples, the areas of variable reflectance forming part of the identification code comprise a dark (or black) area and a light (or white) area. For example, when the identification (ID) code comprises a one-dimensional barcode the ID code may comprise black bars and white spaces separating the black bars. For example, when the ID code comprises a QR code the ID code may comprise black squares arranged in a square grid on a white background.

The ID code to be formed on part a portion of the object may be readable, or scannable, e.g. by a reading or scanning device such as a barcode reader or optical scanner or smart device. Such a pattern described by pattern data allows the track and trace of parts to which the pattern is applied (e.g. following additive manufacturing of the object), as the objects may be printed with their own unique part number or serial number. This may also be used to differentiate between like objects (e.g. ones that have the same or similar geometry in some places but slightly different geometries in other places—such objects may be identified by the printed pattern described by the pattern data.

In another example, the pattern data may comprise other than an ID code, for example another marking including text, a logo, a picture. Such example patterns may not be machine readable. In these examples, the texts, logo, pictures comprise areas of variable reflectance intended to be formed in (a slice of) an object to be generated in additive manufacturing. In such examples, the text, logo or picture may be used to differentiate between objects, or for track-and-trace of such objects, as described above, or may be used to customise certain objects, e.g. with a unique text, logo, or pattern.

The method 100 comprises, at block 106, determining, by a processor, object generation instructions. The object generation instructions determined at block 106 comprise instructions to apply fusing agent (FA) to at least part of a layer of build material corresponding to the portion of the object, the FA being applied at a density corresponding to the reflectance of the generated pattern data.

For example, the instructions may be to apply FA to part of the layer at a density proportional (for example directly or inversely proportional) to the reflectance of the generated pattern data. For example, the instructions may be to apply FA to at least part of the layer at a contone level corresponding (or proportional to) the reflectance of the generated pattern data. In examples where the FA comprises a black ink (such as carbon black) and the build material comprises a white power-like granular material, modifying the density, e.g. according to the instructions generated in block 106 of the method 100, of the black FA to be applied to the white build material may result in areas of variable reflectance in the object. For example, applying black FA to part of a layer of white build material at a relatively low density (or low contone level) will result in the corresponding part of the object having a colour substantially the same as the colour of the build material, e.g. having a relatively light, or white, colour. On the other hand, applying black FA to part of a layer of white build material at a relatively high density (or high contone level) will result in the corresponding part of the object having a colour substantially the same as the colour of the FA, e.g. having a relative dark, or black, colour. In this case, and as will be explained further below, some examples presented herein utilise the colour contrast between the FA and the build material to produce the pattern of variable reflectance, as described by the pattern data, in a portion of the object.

For example, when the pattern data (or ID code described by the pattern data) comprises a dark area (or a black area), e.g. a region of lower reflectance, and a light area (or a white area), e.g. a region of higher reflectance, in one example the instructions (determined at block 106) may be to apply FA to part of the layer of build material corresponding to the dark area of the pattern at a higher density, and to apply FA to part of the layer of build material corresponding to the light area of the pattern at a lower density. In another example, the instructions (determined at block 106) may be to apply FA to part of the layer of build material corresponding to the dark area of the pattern at a higher contone level, and to apply FA to part of the layer of build material corresponding to the light area of the pattern at a lower contone level. Where a black FA and a white build material is used then these examples may result in an object where parts of the object corresponding to lower-reflectance areas of the pattern have lower reflectance, e.g. darker areas of the pattern correspond to darker areas of the object; and where parts of the object corresponding to higher-reflectance areas of the pattern have higher reflectance, e.g. lighter areas of the pattern correspond to lighter areas of the object. In this way, an ID code that is described by the pattern data may substantially be reproduced on a portion of the object in the same colour-scheme.

In another example, the instructions may be to apply FA to part of the layer of build material corresponding to the dark area of the pattern at a lower density, and to apply FA to part of the layer of build material corresponding to the light area of the pattern at a higher density. In another example, the instructions may be to apply FA to part of the layer of build material corresponding to the dark area of the pattern at a lower contone level, and to apply FA to part of the layer of build material corresponding to the light area of the pattern at a higher contone level. Where a black FA and a white build material is used then these examples may result in an object where parts of the object corresponding to lower-reflectance areas of the pattern have higher reflectance, e.g. darker areas of the pattern correspond to lighter areas of the object; and where parts of the object corresponding to higher-reflectance areas of the pattern have lower reflectance, e.g. lighter areas of the pattern correspond to darker areas of the object. In this way, an ID code that is described by the pattern data may substantially be reproduced on a portion of the object but in an inverted colour-scheme (where black areas of the pattern become white areas on a slice of the object etc.).

In some examples, determining object generation instructions may comprise applying halftoning to voxels associated with object generation parameters to determine object generation or print instructions for the layer. As will be familiar to the skilled person, halftoning can result in the selection of a particular print agent in a particular location. For example, an object generation parameter may specify an area coverage or contone level for a print agent. A halftoning screen or algorithm may be used to make selections of locations and amounts of print agents to be placed to produce an intended result (which may be fusion of build material in a simple example, but which may comprise color, transparency, conductivity, density and the like in other examples), for example based on the area coverage. While halftoning is used in this example, in other examples, other techniques may be used. For example, if using piezo printheads, a drop volume could be directly specified. If the additive manufacturing technique is or includes a selective laser sintering technique, the method may comprise specifying a power level of a laser.

In some examples, the method 100 may (e.g. in block 106) comprise generating a fusing agent contone map describing an amount of FA to be applied to an area of a layer of build material corresponding to a voxel of a corresponding slice of the object. Block 106 may comprise modifying the generated contone map based on the pattern data, determined at block 104. For example, the method 100 may (e.g. in block 106) comprise generating a fusing agent contone map describing two drops of FA to be applied to each region of an area of a layer of build material corresponding to each second voxel of a corresponding slice of the object, e.g. using halftoning. However the pattern data, determined at block 104, may comprise an area of very low reflectance and so the method 100 may comprise modifying the contone map based on this pattern data so that three (or four) drops are applied to region of an area of a layer of build material corresponding to each voxel of a corresponding slice of the object, thereby resulting in a darker appearance, or colour, in the corresponding portion of the object.

In some examples the method 100 may (e.g. in block 106) comprise modifying the object model data to account for the pattern data determined at block 104, and then block 106 may comprise generating a fusing agent contone map from the modified object model data so as to generate the instructions to apply FA in amounts corresponding to the pattern described by the pattern data.

In one example the pattern is intended to be formed on an internal part of the object. In this example the region of build material to which FA is applied corresponds to an internal part of the object. In another example the pattern is intended to be formed on an external part of the object. In this example the region of build material to which FA is applied corresponds to an external part of the object.

In some examples, block 106 may comprise determining, by a processor, object generation instructions to apply a detailing agent to at least a part of a layer of build material corresponding to the portion of the object. For example, the instructions may be to apply detailing agent to the part of the layer in a density corresponding to the reflectance of the generated pattern data. For example, the application of detailing agent may be used to enhance any lower-reflectance areas of the pattern, for example, black, or dark, areas of an identification code described by the pattern data. In these examples, in block 106 may comprise generating a detailing agent contone map describing an amount of detailing to be applied to an area of a layer of build material corresponding to a voxel of a corresponding slice of the object. Block 106 may comprise modifying the generated detailing agent contone map based on the pattern data, determined at block 104. In some examples block 106 may comprise modifying the object model data to account for the pattern data determined at block 104, and then block 106 may comprise generating a detailing agent contone map from the modified object model data so as to generate the instructions to apply detailing in amounts corresponding to the pattern described by the pattern data.

Operating, at block 102 of the method 100, may, in one example, comprise receiving object model data. Operating, at block 102, may comprise operating on part of object model data. In some examples, operating, by the processor, at block 102, may cause the processor to determine the pattern data, at block 104, and/or determine the object generation instructions, at block 106. In some examples, operating, by the processor, at block 102, may cause the processor to receive the pattern data.

In some examples, the density of fusing agent to be applied, determined by the object generation instructions, may be to produce a target level of fusing in the build material. For example, the object generation instructions may be to produce a target level of fusing in corresponding parts of layers of the build material, for example higher contone levels to result in greater levels of fusing in parts of the build material corresponding to lower reflectance areas of the pattern described by the pattern data, and lower contone levels to result in lower levels of fusing in parts of the build material corresponding to higher reflectance areas of the pattern described by the pattern data.

The method of FIG. 1 therefore allows a pattern to be formed in a surface, which may be an internal region of the object or an external surface of the object, by varying the amounts of FA agent applied to regions of layers of build material which form individual slices of the object once the layers are fused by energy into slices. The method of FIG. 1 therefore allows ID codes such as barcodes to be printed in the interior, or on the exterior, of an object. The method of FIG. 1 therefore allows a machine-readable object to be generated (e.g. a three-dimensional object having a machine-readable ID code thereon or therein) by a reading or scanning device.

The pattern may be intended to be formed on part of a single slice of the object, in which case FA may be applied to regions of a single layer of build material, or may span multiple slices, in which case FA may be applied to different regions of different layers of build material.

Figure 2:
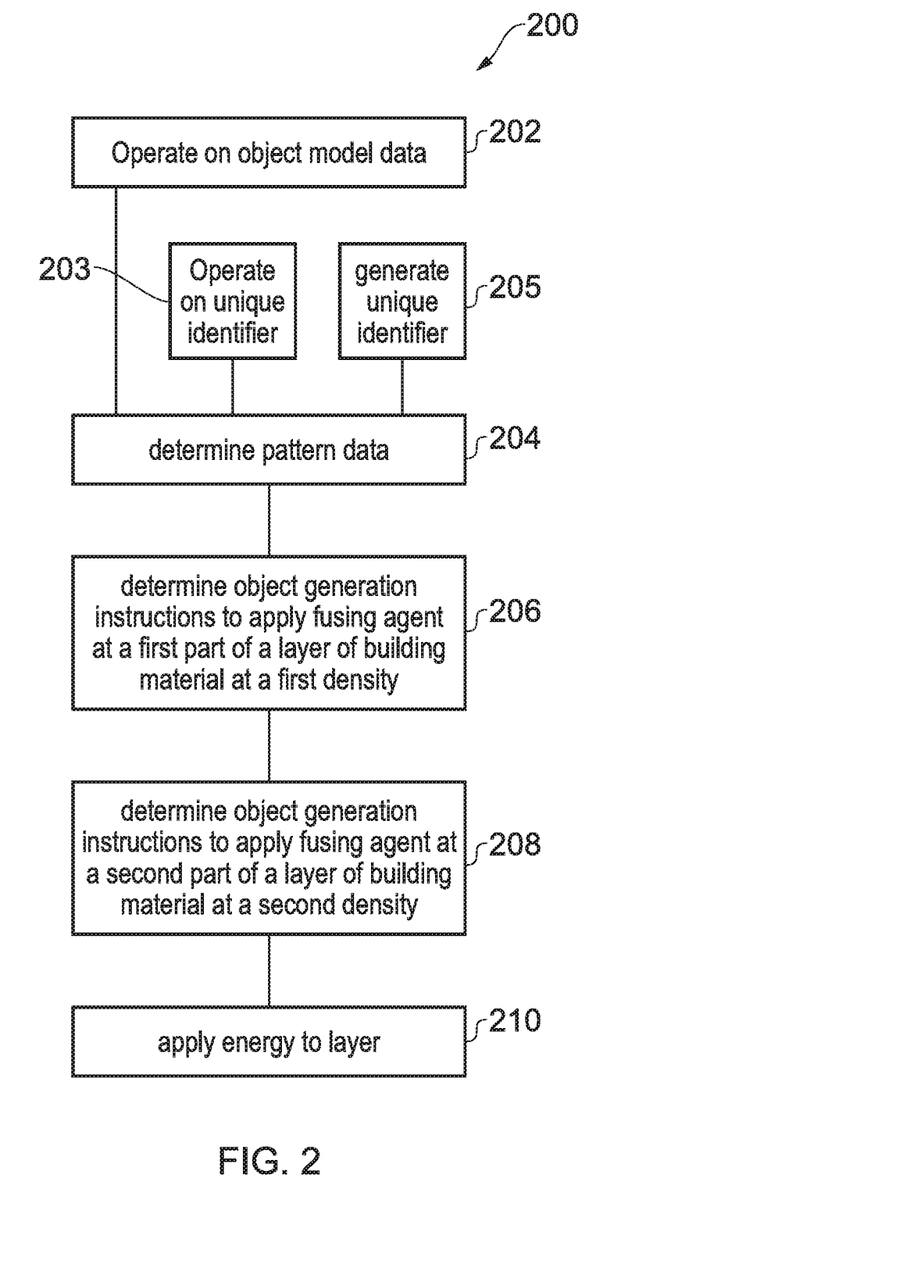
FIG. 2 is a flowchart of an example method of generating an object.

FIG. 2 is an example of a method 200, which may comprise a computer implemented method, and/or which may comprise a method of determining object generation instructions for generating at least one object layer by additive manufacturing, and/or may comprise a method of additive manufacturing or for generating an object (e.g. a three-dimensional object) by additive manufacturing. The method 200 comprises, in block 202, operating on, by a processor, object model data for example as described above in relation to block 102 of method 100.

The method 200 comprises, in block 204, determining, by a processor, pattern data comprising areas of variable reflectance intended to be formed on a portion of the object, for example as described above in relation to block 102 of method 100. For example, the pattern data may comprise an ID code as described above in relation to block 102 for method 100.

The method 200 may comprise, in block 203, operating, by a processor, on a unique identifier, the unique identifier corresponding to the pattern data. Operating, in block 203, on the unique identifier may cause the method 200 to, at block 204, determine the pattern data. For example, the pattern data, at block 204, may be determined by operating on the unique identifier, at block 203. In such examples, method 200 may comprise receiving a unique identifier. For example, a unique identifier may be transmitted or user-inputted to a system or apparatus for additive manufacturing. The unique identifier may be associated with pattern data describing a pattern. Therefore, the processor at block 204 may generate (or determine) the pattern based on the unique identifier operated on at block 203. Therefore the unique identifier may be in a form that specifies the pattern to be produced. For example, each unique identifier may correspond to a specific pattern and operating on the unique identifier at block 203 may comprise accessing a database, e.g. a look-up table, and block 204 may comprise retrieving from the database the pattern data associated with the unique identifier. Therefore, block 204 may comprise loading the pattern data from a memory. According to the method 200, objects may therefore be uniquely identified by the unique identifier corresponding to the pattern printed on that object.

The unique identifier may, in some examples, be a unique number.

In these examples, a pattern (for example an ID code) may wish to be reproduced on an object to be manufactured by additive manufacturing. For example, after a pattern is generated it may be assigned a unique identifier that a processor may retrieve upon operating on the unique identifier. The unique identifier therefore lends reproducibility of a particular pattern and allows retrieval of that pattern. For example, where the pattern data comprises an ID code such as a barcode, the barcode may wish to be reproduced on a three-dimensional object, or plurality of three-dimensional objects. If the barcode corresponds to the unique identifier '1' then, at block 203, operating on '1' may cause, at block 204, the corresponding barcode to be retrieved which may then be reproduced on a portion of the object to be generated by method 200. In this case, repeating method 200, with block 203 and using the same unique identifier '1', may lead to a plurality of objects generated each with the same barcode on them. If scanning the barcode prompts the scanner to retrieve subsequent information (e.g. scanning the barcode with a smart device causes a particular webpage to open) then this subsequent information may then be encoded in each of the plurality of objects generated according to the example method 200. In other examples the unique identifier may correspond to other kinds of pattern data (e.g. other than those describing a barcode) for example pattern data that describes a text, logo, or picture to be printed in or on part of a slice of an object, at least in part, generated by the method 200.

The method 200 may comprise, in block 205, generating, by a processor, a unique identifier. In this case when the method 200 proceeds to block 204, block 204 comprises retrieving, or generating, pattern data. In this example, a processor may generate the unique identifier itself (at block 205) and block 204 may comprise retrieving a particular pattern corresponding to that unique identifier (e.g. as described above in relation to block 203) or block 204 may comprise generating pattern data and assigning that generated pattern data to the generated unique identifier. This allows every printed part, or object, to be uniquely identifier, e.g. by the unique identifier. This latter example therefore represents creating a new pattern and assigning a unique identifier to that pattern so that it may be reproducible, e.g. by the same or another additive manufacturing system.

Therefore, according to some examples, to retrieve a particular pattern to be formed on a portion of a three-dimensional object, a unique identifier corresponding that particular pattern may be inputted (e.g. by a user), at block 203, and operated on to generate the corresponding pattern data or generated by a processor, at block 205, and subsequently operated on to produce the corresponding patter data.

Some examples of the method 200 may proceed to block 204 via block 203 whereas other examples of the method 200 may proceed to block 204 via block 205. Therefore, in some examples, blocks 203 and 205 may be considered alternatives to one another, although in other examples they may both be formed as part of the method 200 (for example, a single object may have multiple patterns intended to be formed therein or thereon and one such pattern may be generated e.g. on-the-fly according to block 205 whereas the other pattern may be retrieved corresponding to a received unique identifier according to block 203).

In the example method 200 the pattern data comprises a first area having a first reflectance and a second area of a second reflectance, the first area corresponding to a first portion of the object to be generated and the second area corresponding to a second portion of the object to be generated, wherein the second reflectance is less than the first.

The method 200 comprises, at block 206, determining object generation instructions to apply FA to a first part of the layer of the build material corresponding to the first portion of the object at a first density (or first contone level), and, at block 208, determining object generation instructions to apply FA to a second part of the layer of the build material corresponding to the second portion of the object at a second density (or second contone level), the second density being greater than the first.

Therefore, as described above in relation to block 106 of the method 100, blocks 206 and 208 may be to reproduce the pattern of variable reflectance on a portion of the object by varying contone levels/FA densities to produce lighter/darker areas on the portion of the object. For example, the first reflectance may be dark and the second reflectance may be light in which case block 206 may comprise applying FA at a higher density/higher contone level and block 208 may comprise applying FA at a lower density/lower contone level.

In one example the pattern is intended to be formed on an internal part of the object. In this example the region of build material to which FA is applied corresponds to an internal part of the object. In another example the pattern is intended to be formed on an external part of the object. In this example the region of build material to which FA is applied corresponds to an external part of the object.

The pattern may be intended to be formed in a single slice of the object to be generated. Accordingly the method 100, and the method 200, may apply FA to the single layer of build material corresponding to that slice. In these examples, the method 100 (in block 106 thereof) or the method 200 (in blocks 206 and/or 208 thereof) may comprise applying FA to a region of that layer that does not correspond to the pattern in a density different to the density at which FA is applied to a region of the layer that does correspond to the pattern. For example, block 206 may comprise applying FA to a first region of a first layer of build material at a first density, and block 208 may comprise applying FA to a second region of the first layer of build material at a second density, the first and second regions of the first layer corresponding to the pattern described by the pattern data. In this example, the method 200 may be to apply FA to a third region of the first layer of build material (the third region being different to the first and second regions) in a third density. The third density may be different to the first and second densities. For example the third density may be in between the first and second densities. For example the third density may be greater than the first density but less than the second density. For example the third density may be in a range of densities defined by the first and second densities (e.g. having the first and second densities as the endpoints of the range). In other words, the third density may modulate within this range. In this example the pattern is intended to be formed in a slice of the object and may comprise black areas (areas where a high density of FA was applied) and white areas (areas where a low density of FA was applied), where the FA comprises black ink and the build material is white, but other areas of a different colour (e.g. grey) where a different amount of FA was applied, e.g. in a moderate density. For example, a barcode comprising black and white bars may be reproduced in an object such that a grey border surrounds the area of the barcode. In this example, FA may be applied to the layer at a high contone level to areas of build material corresponding to black areas of the ID code, at a low contone level to areas of build material corresponding to white areas of the ID code, and at a moderate contone level to areas of build material not corresponding to either the black or white areas of the ID code (e.g. areas of build material not correspond to the ID code, hence not corresponding to the pattern). In another example the ID code may be intended to be formed on an external surface of the object and so parts of layers of build material corresponding to the internal portion of the object may have FA applied at the third density. In this example, no detailing agent, or very little detailing agent, may be applied in the part of the region of the build material corresponding to the first portion of the object (to which FA is applied at the first density) since the application of detailing agent may cool the part of the build material layer to which FA is applied which could adversely impact its level of fusing when energy is applied to fuse the layer. In this example, detailing agent may be applied to the part of the region of build material corresponding to the second portion of the object (to which FA is applied at the greater, second, density) to enhance the fusing of these areas, e.g. to prevent unfused white build material from adhering to the darker, fused, build material.

In another example, the pattern is intended to be formed in a first slice of the object, in which case FA may be applied, as above, to the layer of build material corresponding to that slice, e.g. in first and second densities to corresponding regions of variable reflectance in the pattern. In this example, FA may be applied to another layer of build material, not corresponding to the slice in which the pattern is intended to be formed, in a different, third density. The third density may be any density within a range of densities defined between the first and second densities. For example, the slice in which the pattern is intended to be formed may correspond to a boundary surface of the object, e.g. the final layer of build material to be fused. In this example, FA may be applied to a different layer of build material in a different density to the densities of FA applied to the layer to form the pattern. Therefore, in this example the generated object may comprise the pattern in contrasting light/dark areas of reflectance in a top slice of the object, but with parts of intermediate slices (e.g. forming parts of the internal region of the object) at a third reflectance, somewhere between the light and dark areas on the top slice of the object.

Therefore, block 206 of the example method 200 may comprise determining object generation instructions to apply detailing agent to a first part of a layer of build material at a first detailing agent density and/or block 208 of the example method 200 may comprise determining object generation instructions to apply detailing agent to a second part of a layer of build material at a second detailing agent density.

The method 200 comprises, in block 210, applying energy to the layer to fuse the layer. Block 210 may be performed layer-wise on successive layers of build material to coalesce and solidify each layer to form each slice of the three-dimensional object. Block 210 of method 200 may therefore comprise printing (or generating) the object using the object generation instructions. For example, this may comprise forming a layer of build material, applying print agents, for example through use of 'inkjet' liquid distribution technologies, in location specified in the object generation instructions for an object model slice corresponding to that layer, and applying energy, for example heat, to the layer. Some techniques allow for accurate placement of print agent on a build material, for example by using print heads operated according to inkjet principles of two-dimensional printing to apply print agents, which in some examples may be controlled to apply print agents with a resolution of around 600 dpi, or 1200 dpi. A further layer of build material may then be formed and the process repeated, with the object generation instructions for the next slice.

In some examples, blocks 202 to 208 may be carried out at least partially concurrently with the energy application, or object generation, in block 210. As the processes of blocks 202 to 208 can be relatively resource heavy in terms of processing power and memory storage, this may make efficient use of the resources available.

It will be appreciated that the pattern described by the pattern data may be intended to be formed on an internal portion of the object, or part of an external, boundary, portion of the object, or all of an external, boundary, portion of the object (e.g. an external surface). It will also be appreciated that the varying FA contone levels to create the pattern may be applied to a single layer, in examples where the pattern is intended to be formed on a single slice of the object. However, in other examples, the pattern may be intended to be formed on a portion of the object that corresponds to multiple slices, and therefore multiples layers of build material. For example, if build material is sequentially deposited in "horizontal" layers, and subsequently layer-wise coalesced to divide the object into "horizontal" slices, the pattern may be formed across a plurality of such slices (e.g. a pattern in the object that cuts through a number of horizontal slices). In this example, to form the pattern, FA may be applied to a portion of a first layer of build material, the portion of a second layer of build material, a third layer of build material, etc., with each portion of each layer being aligned in a direction perpendicular to the build bed and perpendicular to the layers and slices. In this way, as energy is applied to each layer (e.g. at block 210) the "vertical" pattern, spanning a number of layers, may be formed into the object. In another example the pattern may be a "diagonal" pattern though multiple slices through the object, formed by applying FA at different densities to different offset regions of different layers of build material.

The method therefore allows for patterns to be formed in a portion of an object, which may be entirely formed on an external surface of the object or an internal portion of the object, or a combination of both.

Figure 3:
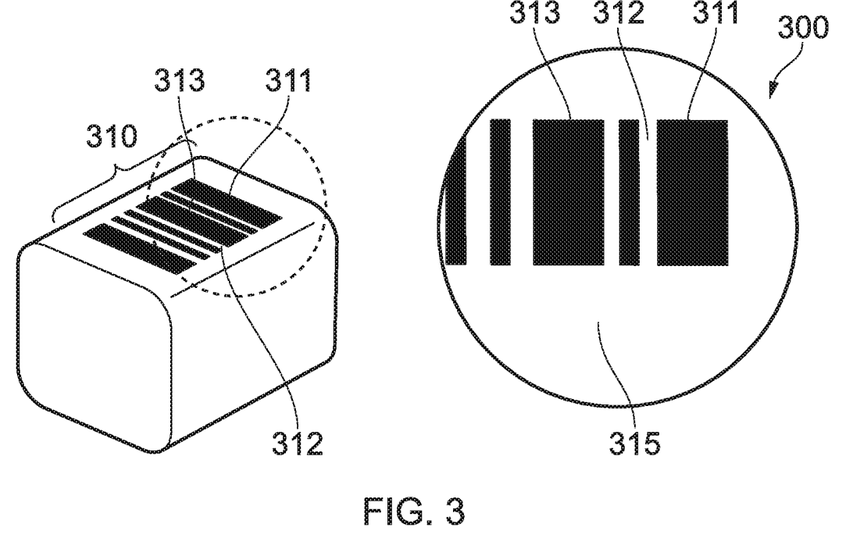
FIG. 3 is a cross section through an example of a three-dimensional printed object.

FIG. 3 shows an example of a cross section through a three-dimensional printed object 300, in this example a cuboid, which shows an intended placement of a pattern 310 formed within an object.

The pattern 310 on the object 300 of this example comprises a one-dimensional barcode, comprising darker bars 311, 313, etc. and lighter bars 312, 314 etc. These may be formed by applying a higher contone level of FA/higher density of FA to at least one area of at least one layer of build material corresponding to the darker areas 311, 313, etc. and by applying a lower contone level of FA/lower density of FA to at least one of at least one layer of build material corresponding to the lighter areas 312, 314, etc.

The pattern 310 may have been generated by applying FA (at varying densities) to a single layer of build material, or a plurality of layers of build material, as discussed above.

For example, the enlarged portion of the object 300 shown schematically in FIG. 3 shows a side, cross-sectional, view through a slice of the object 300. This view in FIG. 3 shows darker areas 311, 313 and a lighter area 312 forming part of the pattern described by pattern data. For example, the darker and lighter areas 311, 312, 313 may form the black/white parts of the barcode, and accordingly FA may have been applied during the additive manufacturing process at first and second levels, respectively. In the region 315 however FA may have been applied at a third contone level that is between the first and second contone levels.

Although FIG. 3 shows the pattern 310 formed in an interior surface of the object 300 (as FIG. 3 is a cross section therethrough), in other examples the pattern 310 may be formed in an external surface of the object 300, or a boundary surface of the object 300, or in a combination of internal and external surfaces/regions in which case the pattern will span multiple slices of the object.

Figure 4:
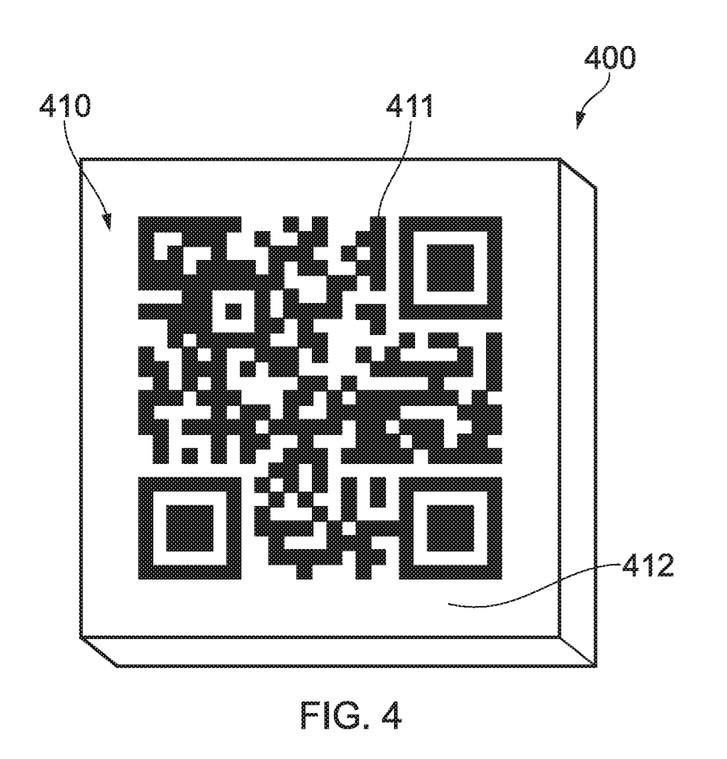
FIG. 4 is an example of a three-dimensional printed object.

FIG. 4 shows an example of a three-dimensional printed object 400, in this example a cuboid, which shows an intended placement of a pattern 410 formed within an object.

The pattern 410 on the object 400 of this example comprises a QR code, comprising dark squares 411 surrounded by lighter squares 412 to give the appearance of dark squares 411 against a lighter background 412. These may be formed by applying a higher contone level of FA/higher density of FA to at least one area of at least one layer of build material corresponding to the squares 411, etc. and by applying a lower contone level of FA/lower density of FA to at least one area of at least one layer of build material corresponding to the lighter squares 412.

The pattern 410 may have been generated by applying FA (at varying densities) to a single layer of build material, or a plurality of layers of build material, as discussed above.

In some examples, the objects 300 and 400 of the examples shown in FIGS. 3 and 4, respectively, may be manufactured using blocks of the methods of FIG. 1 and/or FIG. 2.

Figure 5:
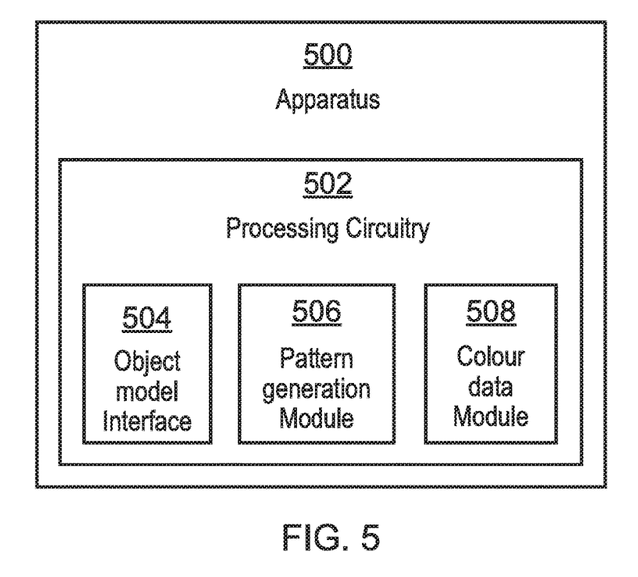
FIG. 5 is a simplified schematic drawing of an example apparatus for additive manufacturing.

FIG. 5 shows an apparatus 500 comprising processing circuitry 502. The processing circuitry 502 comprises an object model interface 504, a pattern generation module 506, and a control data module 508.

The object model interface 504 is to operate on object model data describing at least part of an object to be manufactured by additive manufacturing. The pattern generation module 506 is to determine pattern data comprising regions of variable reflectance intended to be formed on a portion of the object to be manufactured by additive manufacturing. The control data module 508 is to generate control data for generating an object by selectively fusing successive layers of build material. The control data module 508 is to control a print agent applicator to apply fusing agent to a part of a region of build material corresponding to a portion of the object undergoing object generation, the control data module 508 to control the print agent applicator to apply fusing agent at a density corresponding to the reflectance of the pattern data.

In one example, the pattern data comprises a first region having a first reflectance, the first region corresponding to a first portion of the object to be manufactured by additive manufacturing, and a second region having a second reflectance, the second region corresponding to a second portion of the object to be manufactured by additive manufacturing, the second reflectance being less than the first. In this example, the control data module 508 is to generate control data to control a print agent applicator to apply fusing agent to part of a region of the build material corresponding to the first portion of the object at a first density, and to apply fusing agent to part of a region of the build material corresponding to the second portion of the object at a second density, the second density being greater than the first density.

The control data module 508 may be to generate control data to control the print agent applicator to apply FA as described above with reference to the example methods 100 and 200.

The pattern data, determined by the pattern generation module 506, may comprise an identification code, text, logo, or picture, e.g. as discussed above with reference to the example methods 100 and 200, and to the example three-dimensional objects 300 and 400, depicted in FIGS. 3 and 4, respectively.

The control data generated by the control data module 508 may be to apply FA to parts of a layer of build material not corresponding to the pattern data at a density different to the density at which FA is applied to the regions of a layer of build material that do correspond to the pattern data, as described above with reference to the example method 200. The control data generated by the control data module 508 may be to apply FA to a region of a single layer of build material corresponding to the pattern data at a density depending on the reflectance of the pattern, and to apply FA to other layers at a density that is different to the density at which FA is applied to the region of the single layer of build material that does correspond to the pattern data, as described above with reference to the example method 200.

The control data module 508 may also control a print agent applicator to apply detailing agent to a part of a region of build material corresponding to a portion of the object undergoing object generation, the control data module 508 to control the print agent applicator to apply detailing agent at a density corresponding to the reflectance of the pattern data.

Figure 6:
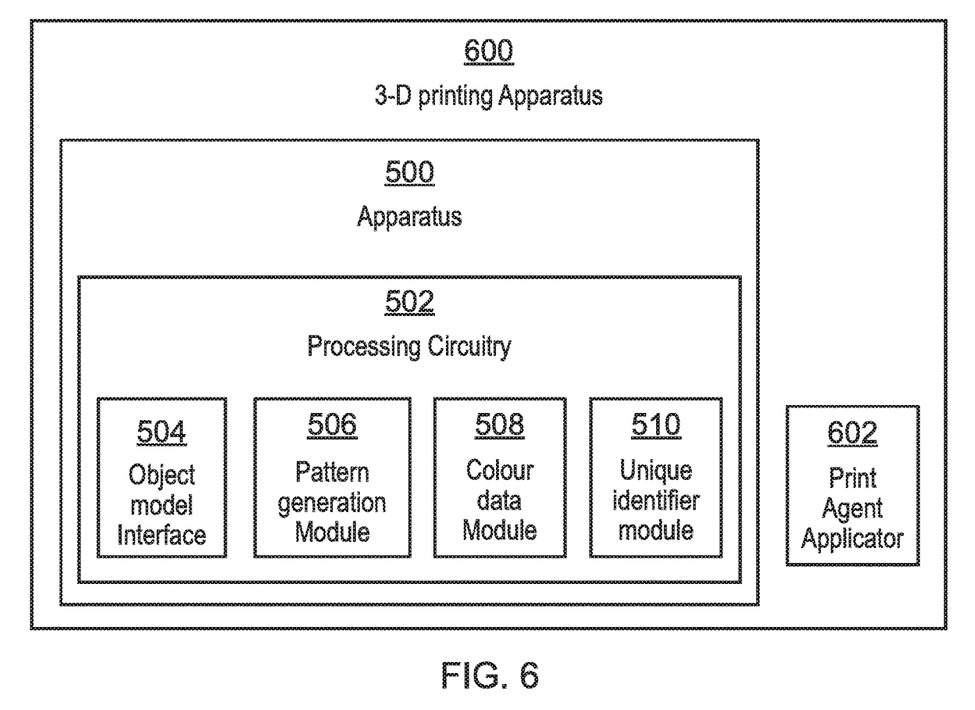
FIG. 6 is a simplified schematic drawing of an example apparatus for additive manufacturing.

FIG. 6 shows an example of 3-D printing apparatus 600. The 3-D printing apparatus 600 comprises the apparatus 500 of FIG. 5.

The apparatus 500 in the example of FIG. 6 comprises a unique identifier module 510. The unique identifier module 510 is to generate a unique identifier, for example as discussed above with reference to blocks 203 and 205 of the method 200 of the example of FIG. 2. For example, the unique identifier module 510 may be to generate a unique identifier and the pattern generation module 508 may be to generate the pattern data based on the unique identifier generated by the module 510. In other examples, the pattern generation module 506 may be to determine pattern data based on a received unique identifier module 510 (e.g. user-inputted).

The 3-D printing apparatus 600 comprises a print agent applicator 602. The print agent applicator 602 is to apply, under control of the control instructions generated by the control data module 508, FA and/or detailing agent in densities/contone levels corresponding to the reflectance of the pattern.

In some examples, the 3-D printing apparatus 600 may be to generate the object using the control data. For example, the 3-D printing apparatus 600 may operate under the control of control data generated based on the print instructions to generate at least one object in a plurality of layers according to the generated control data/print instructions. The 3-D printing apparatus 600 may generate an object in layer-wise manner by selectively solidifying portions of layers of build materials. The selective solidification may in some examples be achieved by selectively applying print agents, for example through use of 'inkjet' liquid distribution technologies, and applying energy, for example heat, to the layer. The 3-D printing apparatus 600 may comprise additional components not shown herein, for example a fabrication chamber, a print bed, print head(s) for distributing print agents, a build material distribution system for providing layers of build material, energy sources such as heat lamps and the like, which are not described in detail herein.

The processing circuitry 502 or the modules thereof, and/or the 3-D printing apparatus 600 may carry out any or any combination of the blocks of FIG. 1 or FIG. 2.

Figure 7:
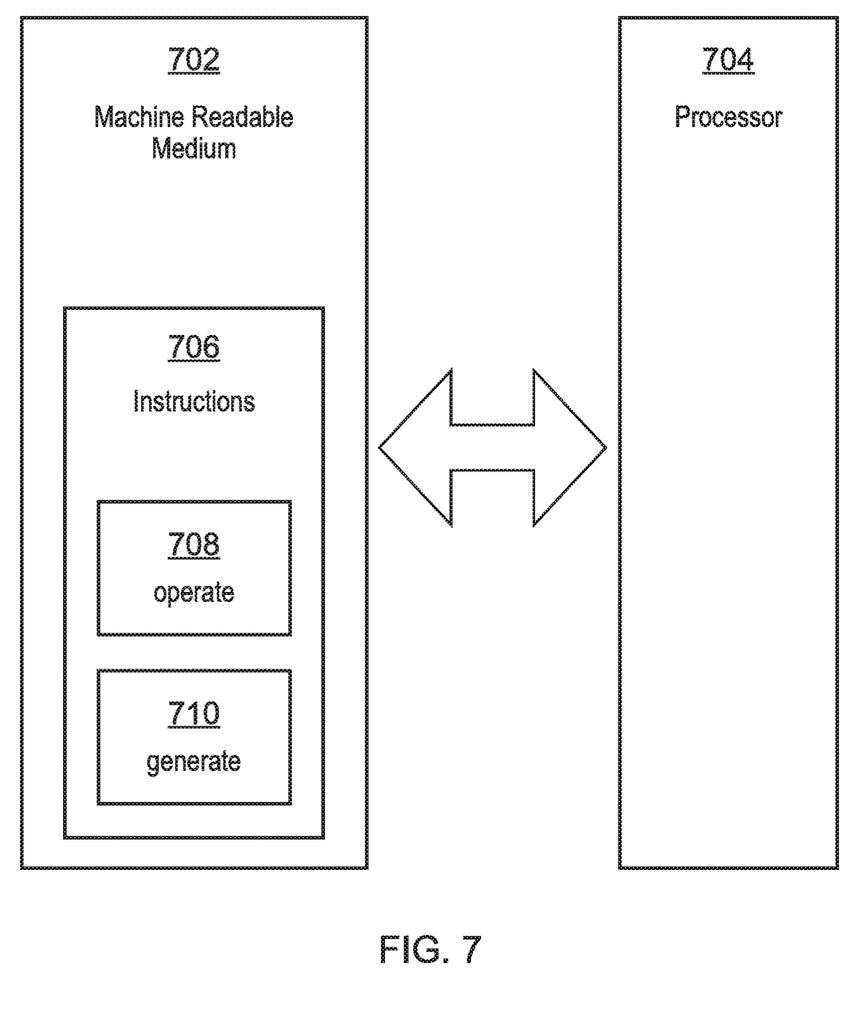
FIG. 7 is an example of a machine readable medium in association with a processor.

FIG. 7 shows an example tangible (and non-transitory) machine readable medium 702 in association with a processor 704. The tangible machine readable medium 702 comprises instructions 706 which, when executed by the processor 704, cause the processor 704 to carry out a plurality of tasks. The instructions 706 comprise instructions 708 to operate on object model data describing an object to be manufactured comprising machine readable code data describing a pattern of variable reflectance to be formed on a portion of an object to be manufactured. The instructions 706 comprise instructions 710 to generate print instructions for generating the object, wherein the print instructions comprise instructions to vary the contone level of fusing agent applied to corresponding regions of build material according to the reflectance of the machine-readable code data.

The machine readable code data may, in one example, comprise a dark portion and a light portion and the instructions 706 may be to cause the processor 704 to generate print instructions for applying FA to the light portion at a first contone level and to generate print instructions for applying FA to the dark portion at a second contone level, the second contone level being greater than the first. The instructions 706 may be to cause the processor 704 to generate print instructions for applying fusing agent to a part of a region of the build material not corresponding to the machine-readable code data at a third contone level, the third contone level being greater than the first contone level and less than the second contone level, for example a contone level that is different to the fusing agent contone level used to generate the machine readable code data.

The instructions 706 may be to cause the processor 704 to generate print instructions to apply FA to each of a plurality of layers of a build material to generate the machine readable code data.

The machine readable medium 702 of the example of FIG. 7 may comprise instructions to perform any, or a combination, of the blocks of methods 100 or 200 as set out in FIG. 1 or 2, respectively; and/or to provide the object model interface 504, pattern generation module 506 and/or the control data module 508 of the examples of FIGS. 5 and 6.

Examples in the present disclosure can be provided as methods, systems or machine-readable instructions, such as any combination of software, hardware, firmware or the like. Such machine-readable instructions may be included on a computer readable storage medium (including but not limited to disc storage, CD-ROM, optical storage, etc.) having computer readable program codes therein or thereon.

The present disclosure is described with reference to flow charts and/or block diagrams of the method, devices and systems according to examples of the present disclosure. Although the flow diagrams described above show a specific order of execution, the order of execution may differ from that which is depicted. Blocks described in relation to one flow chart may be combined with those of another flow chart. It shall be understood that each block in the flow charts and/or block diagrams, as well as combinations of the blocks the flow charts and/or block diagrams, can be realized using machine readable instructions.

The machine-readable instructions may, for example, be executed by a general-purpose computer, a special purpose computer, an embedded processor or processors of other programmable data processing devices to realize the functions described in the description and diagrams. In particular, a processor or processing apparatus may execute the machine-readable instructions. Thus, functional modules of the apparatus (such as the pattern generation module 506 and/or the control data module module 508) may be implemented by a processor executing machine readable instructions stored in a memory, or a processor operating in accordance with instructions embedded in logic circuitry. The term 'processor' is to be interpreted broadly to include a CPU, processing unit, ASIC, logic unit, or programmable gate array etc. The methods and functional modules may all be performed by a single processor or divided amongst several processors.

Such machine-readable instructions may also be stored in a computer readable storage that can guide the computer or other programmable data processing devices to operate in a specific mode.

Machine readable instructions may also be loaded onto a computer or other programmable data processing device(s), so that the computer or other programmable data processing device(s) perform a series of operations to produce computer-implemented processing, thus the instructions executed on the computer or other programmable devices realize functions specified by block(s) in the flow charts and/or the block diagrams.

Further, the teachings herein may be implemented in the form of a computer software product, the computer software product being stored in a storage medium and comprising a plurality of instructions for making a computer device implement the methods recited in the examples of the present disclosure.

While the method, apparatus and related aspects have been described with reference to certain examples, various modifications, changes, omissions, and substitutions can be made without departing from the scope of the present disclosure. It is intended, therefore, that the method, apparatus and related aspects be limited by the scope of the following claims and their equivalents. It should be noted that the above-mentioned examples illustrate rather than limit what is described herein, and that those skilled in the art will be able to design many alternative implementations without departing from the scope of the appended claims. Features described in relation to one example may be combined with features of another example.

The word "comprising" does not exclude the presence of elements other than those listed in a claim, "a" or "an" does not exclude a plurality, and a single processor or other unit may fulfill the functions of several units recited in the claims.

The features of any dependent claim may be combined with the features of any of the independent claims or other dependent claims.

The invention claimed is:

1. A method of additive manufacturing comprising:
 operating, by a processor, on an object model data describing a pattern area that is at least part of an object to be generated in additive manufacturing, and a non-pattern area that is the remainder of the object outside of the pattern area;
 determining, by the processor, a unique identifier pattern data comprising areas of variable reflectance intended to be formed on the pattern area, wherein the unique identifier pattern data is added to the object model data to identify the object to be generated;
 determining, by a processor, object generation instructions to apply a single color fusing agent to some portion of a layer of a build material for an entirety of the object including the pattern and the non-pattern area of the object to be generated by fusing the build material,
 wherein the single color fusing agent is applied to the non-pattern area at a first or standard density and wherein the single color fusing agent is applied to the pattern area at a second density higher than the standard density of the non-pattern area and at a third density lower than the standard density of the non-pattern area to correspond to the areas of variable reflectance of the unique identifier data pattern to identify the object to be generated; and
 controlling an additive manufacturing printing apparatus using control data generated based on the object generation instructions to generate the object in a plurality of layers.

2. The method according to claim 1 further comprising: generating, by the processor the unique identifier pattern data based on a unique identifier.

3. The method according to claim 1 wherein the unique identifier pattern data describes an identification code.

4. The method according to claim 1 further comprising applying heat energy to the layer to fuse the layer.

5. The method of claim 1 wherein the single color fusing agent is carbon black and the build material is powdery white.

6. The method of claim 1 wherein the single color fusing agent is carbon black and the build material is powdery white, wherein the carbon black fusing agent applied to the powdery white build material at the first density causes a white color, wherein the carbon black fusing agent applied to the powdery white build material at the second density is to cause a black color, wherein the carbon black fusing agent applied to the powdery white build material at the third density is to cause a grey color.

7. An apparatus comprising:
 a processing circuitry, wherein the processing circuitry comprises an object model interface to operate on object model data describing at least part of an object to be manufactured by additive manufacturing;
 a pattern generation module to determine a unique identifier pattern data comprising regions of variable reflectance intended to be formed on the part of the object to be manufactured by the additive manufacturing, wherein the unique identifier pattern data is added to the object model data to identify the object to be manufactured; and
 a control data module to generate control data for generating the part of the object by selectively fusing successive layers of a build material, wherein the control data module is to generate control instructions to control a print agent applicator to apply a single color fusing agent to a build material by varying the density of the single color fusing agent to corresponding to the part of the object to be manufactured, wherein the single color fusing agent is applied at a density corresponding to the variable reflectance of the unique pattern data.

8. An apparatus according to claim 7 further comprising:
a unique identifier module to generate a unique identifier, wherein the pattern generation module is to generate the unique identifier pattern data based on the unique identifier.

9. An apparatus according to claim 7 wherein the pattern generation module is to determine the unique identifier pattern data based on the unique identifier.

10. An apparatus according to claim 7 wherein the unique identifier pattern data comprises a first region with a first reflectance, and a second region with a second reflectance, wherein the control data module is to generate the control data to control the print agent applicator to apply the single color fusing agent to the part of the object to be manufactured at a first density corresponding to the first reflectance and at a second density corresponding to the second reflectance.

11. An apparatus according to claim 7 wherein the unique identifier pattern data describes an identification code.

12. An apparatus according to claim 7 which comprises a 3D printing apparatus.

13. A non-transitory computer-readable storage medium comprising a set of computer-readable instructions stored thereon, which, when executed by a processor of a printing system, cause the processor to:
operate on object model data describing an object to be manufactured, the object to be manufactured having machine-readable code data comprising a pattern of variable reflectance to be formed on a portion of the object to be manufactured to identify the object to be manufactured; and
generate print instructions for generating the object, wherein the print instructions comprise instructions to vary a contone level of a single color fusing agent applied to corresponding regions of a build material according to the variable reflectance of the machine-readable code data.

14. The non-transitory computer-readable storage medium according to claim 13 wherein machine-readable code data comprises a dark portion and a light portion; and wherein the instructions are to cause the processor to:
generate print instructions for applying the single color fusing agent to the light portion at a first contone level; and
generate print instructions for applying the single color fusing agent to the dark portion at a second contone level, the second contone level being greater than the first contone level.

15. The non-transitory computer-readable storage medium according to claim 14 wherein the instructions are to cause the processor to:
generate print instructions for applying the single color fusing agent at a third contone level to an area beyond the portion of the object on which the pattern of variable reflectance is formed, wherein the third contone level is between the first contone level and the second contone level.

16. The non-transitory computer-readable storage medium according to claim 13 wherein the instructions are to cause the processor to:
generate print instructions to apply the single color fusing agent to each of a plurality of layers of build material to generate the machine-readable code data.

* * * * *